Nov. 25, 1930.  H. H. BOYCE  1,782,405
INSTRUMENT BOARD MOUNTING
Filed April 29, 1927  2 Sheets-Sheet 1
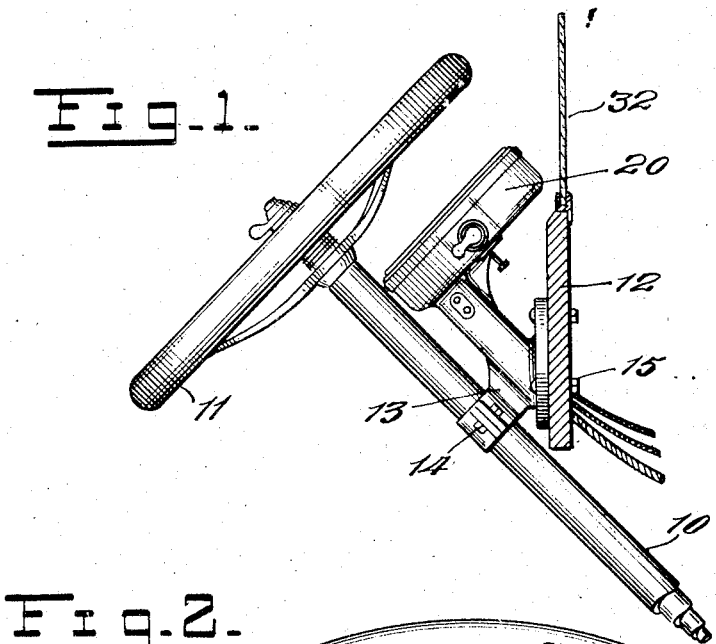
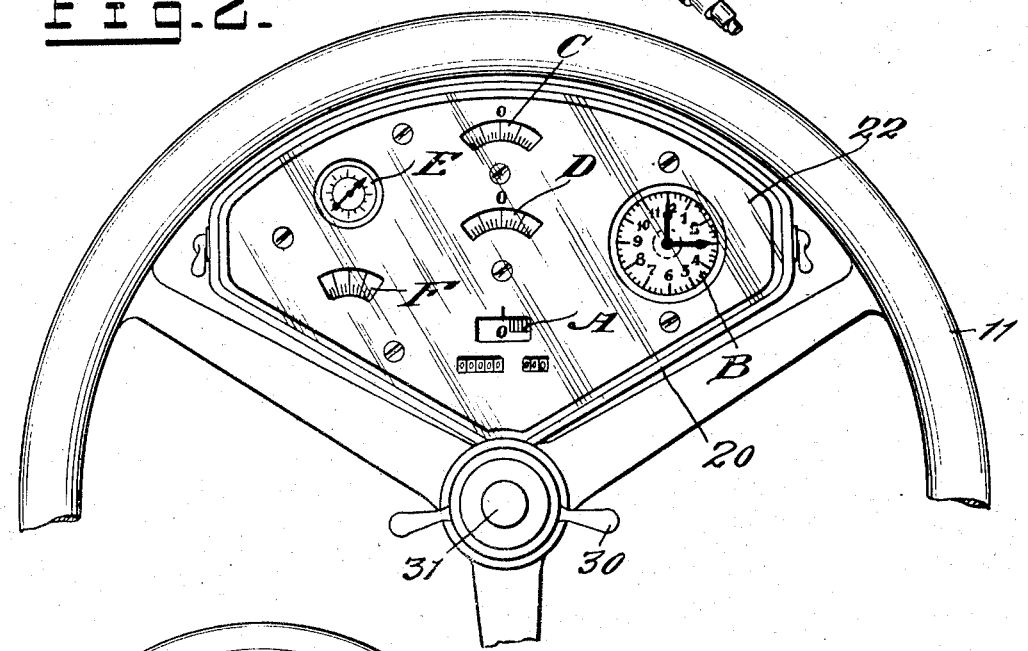
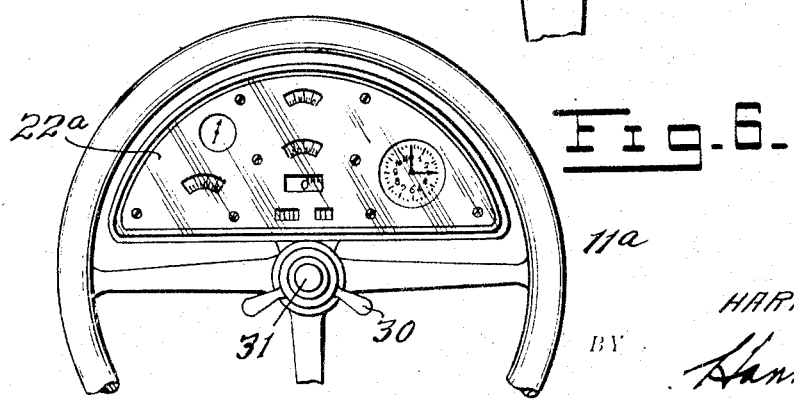
INVENTOR
HARRISON H. BOYCE
ATTORNEY Nov. 25, 1930.  H. H. BOYCE  1,782,405
INSTRUMENT BOARD MOUNTING
Filed April 29, 1927   2 Sheets-Sheet 2
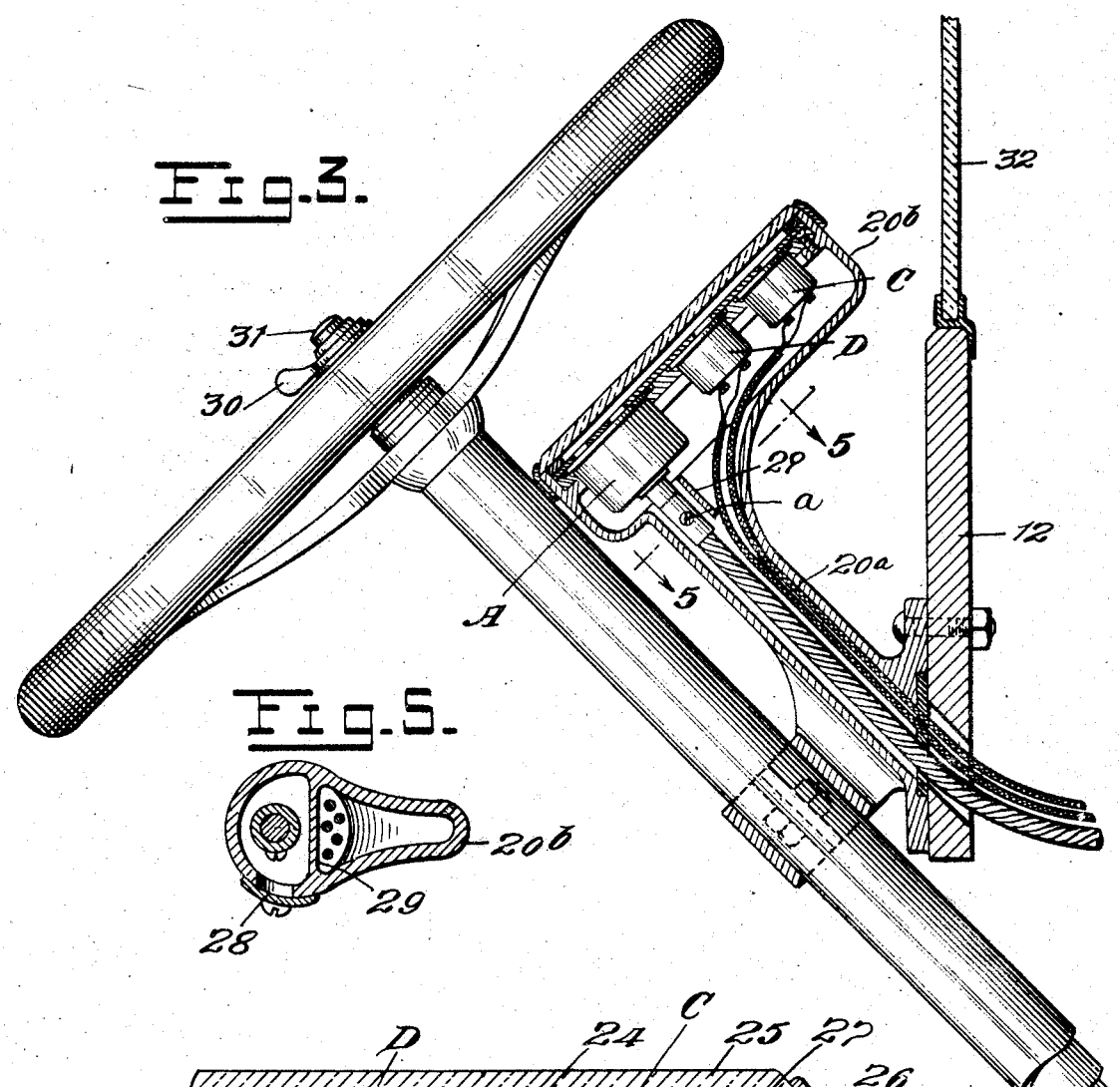
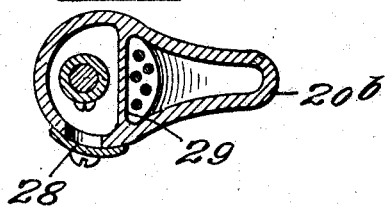
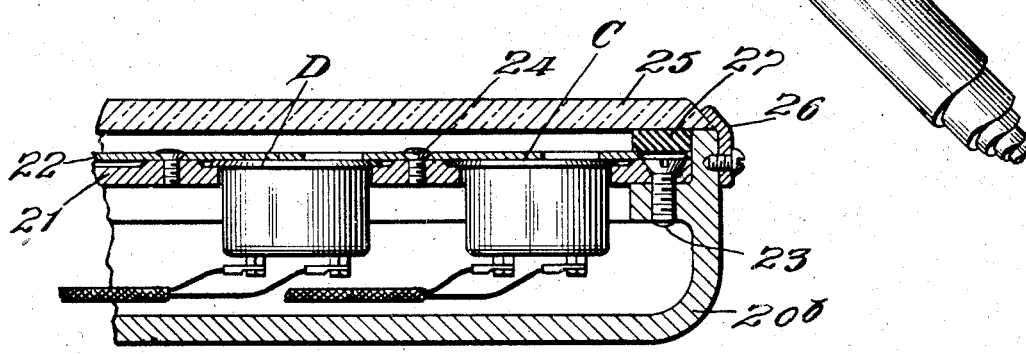
INVENTOR
HARRISON H. BOYCE
BY
ATTORNEY Patented Nov. 25, 1930

1,782,405

UNITED STATES PATENT OFFICE

HARRISON HURLBERT BOYCE, OF JERICHO, NEW YORK

INSTRUMENT-BOARD MOUNTING

Application filed April 29, 1927. Serial No. 187,615.

This invention relates to an improved instrument board for motor vehicles and has particular relation to a combined instrument board unit to be mounted adjacent the steering wheel and in position for easy reading.

It is the principal object of this invention to provide means for more readily reading the necessary instruments of a motor vehicle by combining them into a separate unit mounted adjacent the steering wheel.

It is a further object of this invention to so construct the instrument board unit and steering wheel that the operator's vision of the complete set of instruments will be substantially unimpaired.

It is a further object of this invention to so mount the instruments necessary in motor vehicle construction that they may be adjacent to but unaffected by the unsupported end of the steering column.

Another object of the invention is to provide an improved, simplified and cheap instrument board and means for mounting and supporting the instrument board adjacent the steering wheel.

Further objects and advantages will appear as the description of the following drawings, which exemplify two forms of embodiment of the invention, proceeds and in which, Fig. 1 is a side view of a steering wheel and dash showing the mounting of the instrument board unit.

Fig. 2 is a plan view of a steering wheel showing the location of the face of the improved instrument board unit.

Fig. 3 is an enlarged sectional view of the board and column and shows the details of the instrument board unit.

Fig. 4 is a partial detail view of a part of the instrument board unit showing the method of construction.

Fig. 5 is a cross sectional view on the line 5—5 of Fig. 3, and

Fig. 6 is a plan view similar to Fig. 1 but showing a modified arrangement.

The problem of providing an adequate combined unit of the necessary instruments in use on the present day motor vehicles, in such a relation to the operator that they might be readily observed without interfering with the view of the road ahead, has been the subject of considerable thought and attention. The usual construction has been to place the instruments either in a separate unit on the false dash or cowl instrument board or in various separate spread out relations thereon. The disadvantage, however, is that their distance from the observer's eye has required the observer to remove his gaze from the road and, too often, the instruments cannot be accurately read under such conditions.

Another method devised was to locate the instruments on the end of the steering column but the vibration and consequent cost of reconstruction of the steering column to permit turning of the steering wheel without interfering with instruments has been an insurmountable commercial difficulty.

In Fig. 1, the standard or any preferred form of steering column 10 surmounted by the steering wheel 11 is supported from the supplementary or cowl dash 12 by means of the bracket 13 suitably clamped to the steering column 10 by the bolts 14 and to the dash 12 by the bolts 15.

Extending substantially parallel to the steering column 10 and integral with the lower part of the bracket 13 is the combination instrument board unit 20 particularly forming the subject of this invention.

The hollow stem 20$^a$ supports the head 20$^b$ by being integral with the bracket 13 and is also adapted to receive and enclose the necessary wire and cable connections through its center. The stem 20$^a$ is connected to the dash 12 and supports the steering column 10.

The head 20$^b$ of this instrument unit is adapted to contain the necessary or desirable instruments used in conjunction with motor vehicles and such a head might preferably contain the instruments as shown in Fig. 2, such as the speedometer and odometer A, clock B, engine temperature recorder C, ammeter D, oil pressure gauge E and gasoline or fuel gauge F. These instruments are merely suggestive and in no way intend to indicate the exact location or number or kind of indicating devices to be used but, show a typical construction in which the various operating conditions of the motor vehicle may be quickly determined.

Fig. 2 also shows that the steering wheel 11 contains but three spokes and by making the face of the combination instrument unit of the shape of one of these sectors of the wheel, the entire face may be observed at once in the normal position of the wheel while the motor vehicle is driven in a straight direction. As this is the usual driving condition, it is obvious that the instruments are substantially always in full view.

The details of construction shown in Figs. 3, 4 and 5 show that the head 20<sup>b</sup> of the unit is adapted to receive a detachable plate 21 into which the individual instruments are set, and on which they are rigidly held by the apertured face 22 with suitable openings corresponding with the dial graduations on the respective instruments. Screws 23 and 24 are shown to attach the respective parts together.

To insure against dust and moisture, the instrument unit is provided with a single unitary transparent covering or plate glass 25 retained in position by the bezel ring 26 and protected from injury by the gasket 27 which may be of cork or rubber interposed between the glass and the face 22.

As shown in Fig. 3, the cable to the speedometer and odometer A is commonly attached by means of a set screw $a$ closely adjacent to the instrument. It is, therefore, necessary to provide an opening 28 in the stem 20<sup>a</sup> in order that the desired tool may be inserted to remove or install the instrument cable. To protect the upper end of the wires from injury from the rotating speedometer shaft, as well as to additionally brace the head, a cross piece 29 divides the upper end of the stem 20<sup>a</sup> into suitable compartments.

In Fig. 6, a slight variation in the form of the steering wheel 11<sup>a</sup> is shown and in which the three spokes are at such positions that a semi-circular sector is left without any cross members to interfere with clear vision of the instrument unit as long as the motor vehicle proceeds in a straight direction. The face 22<sup>a</sup> of the combination instrument board unit in this modification is also of the same shape as the steering wheel opening.

There is also shown for purpose of illustration the usual arrangement of spark and throttle control levers 30 with the central horn button 31 on the steering wheel, and a partial view of the windshield 32 attached to the dash board 12, but these form no part of this invention more than to locate the relative parts thereof.

It is to be noted that the bracket 13 of the instrument unit 20 supports the steering column from the supplementary dash and is not in any way affected by the twisting or ordinary vibrating action that may come through the steering column. This particularly prevents damage to the delicately jeweled instruments and preserves the accuracy of all the instruments, and in this particular arrangement provides a means to support the steering column.

While I have shown preferred arrangements of combination instrument board units in relation to various shaped steering wheels, I, nevertheless, do not wish to be limited to the exact showing as I am aware that various modifications can be made by persons skilled in the art, and I therefore desire protection within the spirit and scope of this application and of the appended claims.

I claim:

1. In a motor vehicle, in combination with a supporting dash and a steering column supported thereby, an intermediate bracket supporting said steering column comprising a hollow stem extending upwardly and parallel to said steering column, the upper part being enlarged to accommodate a plurality of instruments indicating various motor vehicle conditions.

2. In a motor vehicle, in combination with the steering column and supporting dash, a steering wheel superposed on said steering column, and a combined instrument board extending close to but not in contact with the end of the steering column and shaped to be entirely seen between the adjacent wheel spokes when the vehicle is driven in a straight direction.

3. In a motor vehicle, a combination steering wheel support and instrument board including a bracket portion adapted to support a steering column, an elongated hollow portion substantially parallel to the steering column adapted to receive a speedometer cable and other operating connections, an enlarged head portion adapted to receive an instrument plate, a multiplicity of motor vehicle indicating instruments set flush with the instrument plate, a retaining plate to detachably retain the instruments and a transparent cover enclosing the entire head from moisture and dust.

4. In a motor vehicle, the combination of an instrument board and steering column surmounted by a steering wheel, the said instrument board being unaffected by the vibrations of the unsupported end of the steering column and being entirely visible through the steering wheel when the car is being driven in a forward direction.

5. A combination steering column instrument board entirely visible through the spokes of the steering wheel, and adjacent the under side of said wheel, the head of said instrument adapted to retain recording and nonrecording instruments, said recording instrument being connected to a moving part of the vehicle by a flexible cable, and other connections to other indicating instruments, separated from said flexible cable by a partition, all of said connections extending from said instrument through a hollow stem substantially parallel to the steering column.

6. In a motor vehicle having an operator's position, a steering column, a combination instrument board adjacent said steering column and a steering wheel associated with said steering column and formed with an aperture thru which all instruments carried by said board, are visible by an operator of the vehicle when in the operator's position.

7. In a motor vehicle, having a steering column the combination of an instrument board, means for attaching the board to the column and to a fixed part of the vehicle, a steering wheel associated with said steering column and formed with an aperture through which said instrument board is entirely visible when the vehicle is driven in a straight direction.

8. In a motor vehicle having a dash, the combination of an instrument board and a steering column surmounted by a steering wheel, said board having means to connect it firmly to said column and to the dash of the vehicle, said board being mounted so as to be unaffected by vibrations of the steering column and being shaped to be entirely visible through the space between the adjacent spokes of the steering wheel.

9. In a motor vehicle having a dash and a steering wheel, said steering wheel having an enlarged open sector of greater than 100° central angle between two spokes, an instrument board secured to the dash and the column of the steering wheel and disposed between the dash and said steering wheel, said board having substantially the same shape as that part of the wheel having the enlarged open sector between adjacent spokes and the included section of the rim, said board and said opening coinciding when the vehicle is driven in a straight ahead direction.

10. In a motor vehicle in combination with the dash, a steering column adjacent thereto, a bracket interposed between said dash and said column to rigidly support said steering column, said bracket being further provided with an extending portion, a steering wheel surmounting said steering column, the extending portion of said bracket extending to a point closely adjacent said steering wheel, said bracket having an enlarged head portion adapted to receive a plurality of indicating instruments and means within said bracket whereby said instruments may be operatively connected to said vehicle, said instruments being adapted to be read through an aperture in said steering wheel.

11. In a device of the class described a dash board, a steering column, a spoked steering wheel surmounting said steering column, a plurality of indicating instruments, a support for said indicating instruments, said support being rigidly secured to said dash board, said support supporting said steering column at a point opposite the point of its attachment to the dash board so that vibration of said steering column will not affect said instruments, said instruments being closely adjacent and entirely visible through said steering wheel, the head of said bracket supporting said instruments being substantially the size and shape of that portion of the steering wheel between adjacent spokes and the included part of rim of the wheel.

In testimony I have affixed my signature to this specification.

HARRISON H. BOYCE.